(No Model.)  
2 Sheets—Sheet 1.
J. HARPER.
WIRE FENCE MACHINE.
No. 487,184. Patented Nov. 29, 1892.
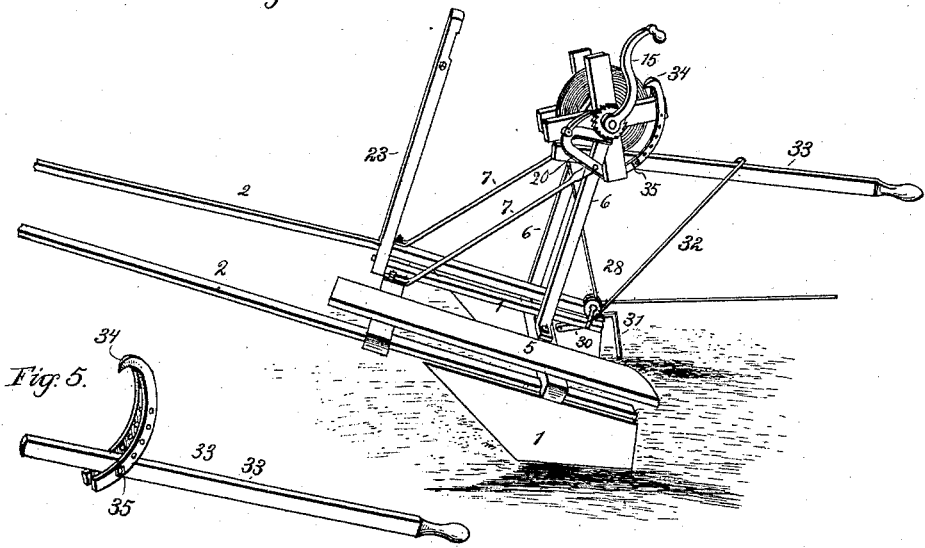
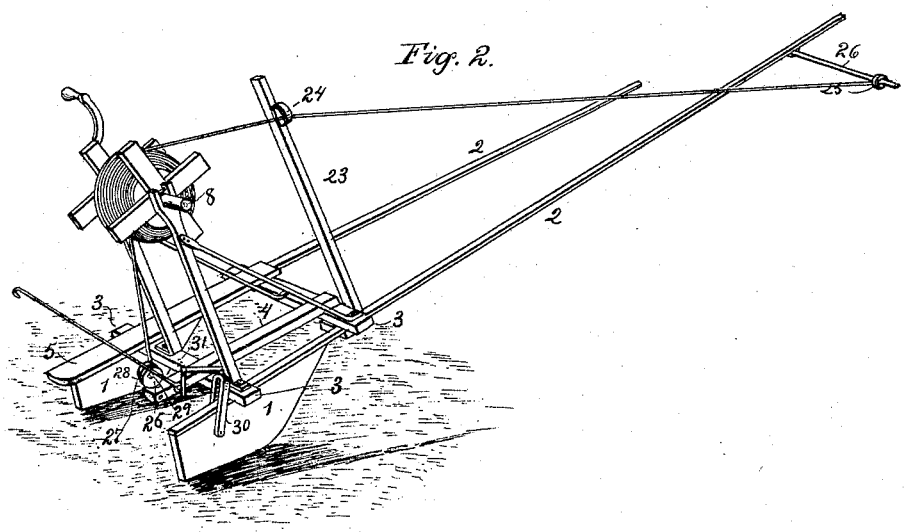
WITNESSES.  
Victor J. Evans  
W. A. Redmond
INVENTOR:  
John Harper,  
by J. F. Beale  
Atty.
THE NORRIS PETERS CO., PHOTO-LITHO., WASHINGTON, D. C.

(No Model.) 2 Sheets—Sheet 2.

J. HARPER.
WIRE FENCE MACHINE.

No. 487,184. Patented Nov. 29, 1892.

WITNESSES.
Victor J. Evans
W. A. Redmond

INVENTOR.
John Harper,
by J. F. Beale
Atty.

UNITED STATES PATENT OFFICE.

JOHN HARPER, OF FAIRFIELD, IOWA.

WIRE-FENCE MACHINE.

SPECIFICATION forming part of Letters Patent No. 487,184, dated November 29, 1892.

Application filed February 3, 1892. Serial No. 420,216. (No model.)

*To all whom it may concern:*

Be it known that I, JOHN HARPER, a citizen of the United States, residing at Fairfield, in the county of Jefferson and State of Iowa, have invented certain new and useful Improvements in Wire-Fence Machines; and I do hereby declare the following to be a full, clear, and exact description of the invention, such as will enable others skilled in the art to which it appertains to make and use the same.

My invention relates to wire-fence machines.

The object of my invention is to produce a machine adapted to horse-power for reeling and unreeling wire and stretching the same on fence-posts, in which provision shall be made for protecting the horse from liability to injury by the wire and whereby the operator may stand on the machine to control the mechanism for winding, unwinding, or stretching the wire.

It is also my object to provide a frame for wire-fence machines which shall run nearer to the fence-posts and therefore nearer in line with the wire to be reeled, unreeled, or stretched. I also provide a novel form of stretching-lever specially adapted to spools now in use, means for automatically anchoring the frame when stretching the wire, and means for regulating the tension upon the wire and reel shaft.

Figure 3:
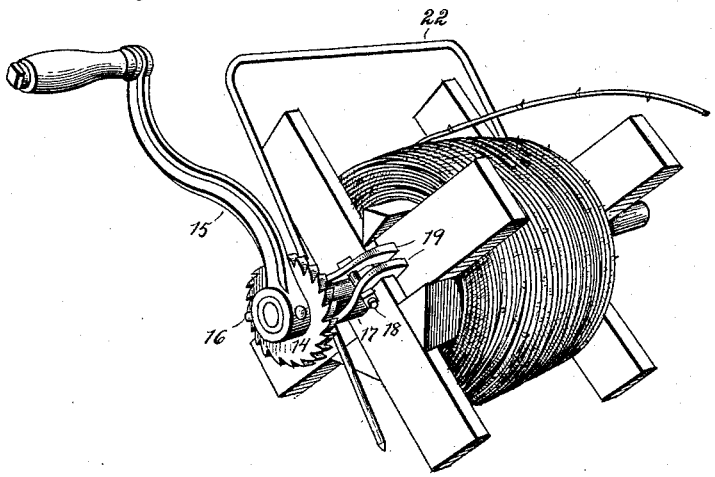
Figure 4:
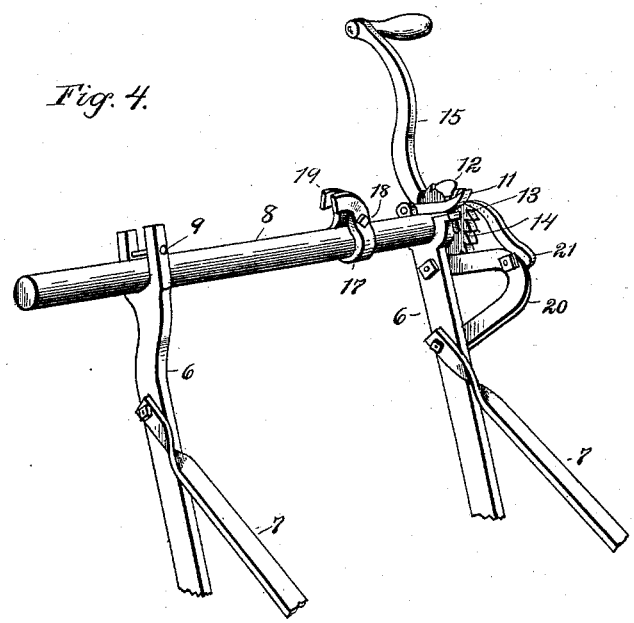

In the accompanying drawings, forming a part of this specification, Figure 1 is a perspective view showing the machine in operative position for stretching the wire. Fig. 2 is a perspective view showing the machine in operative position for taking up wire. Fig. 3 is a detail perspective showing the reel dismounted and provided with a portable frame or holder. Fig. 4 is a detail perspective of the reel-shaft and bearings, showing tension devices, &c. Fig. 5 is a detail of the stretching-lever.

1 1 denote runners, upon which are mounted shafts 2 and a frame consisting of cross-pieces 3, a brace-bar 4, and a platform 5. Upon this frame are secured two uprights 6, having tie-rods 7. Said uprights are bifurcated at their upper ends to form bearings for the reel-shaft 8. As shown in Fig. 4, said shaft is detachably mounted in said bearings and is secured in position by a pin 9 and a tension-clamp 11, having a set-screw 12, which engages with an ear 13, formed integral with the upright.

14 is a ratchet-wheel having a crank-arm 15 made integral therewith, provided with a handle and having a detachable key-pin 16, which passes through a hole in the end of the reel-shaft for locking them together.

17 is an adjustable spool-holder and serves to secure the spool upon the shaft. Said holder is formed of a single piece of metal doubled upon itself, forming spring-arms and having an open sleeve or bearing for the reel-shaft formed in the bend of said arms. The arms are perforated to receive a tension-screw 18, and their ends are bent at right angles to form horizontally-projecting lugs 19, which engage with slots cut in the cross-pieces of a wire reel or spool, as shown in Fig. 3, holding the reel and causing the same to revolve with the shaft.

20 is a bracket or U-shaped arm secured to the upright and is provided with a pawl 21, which engages with the ratchet-wheel.

22 is an iron rod or frame bent to form two right angles, as shown in Fig. 3. One of the projecting ends passes through a perforation in the reel-shaft and extends below the same, while the other end is bifurcated to form a saddle or bearing in which the free end of the reel-shaft rests.

23 is an upright arm pivoted to the forward cross-piece of the frame and provided with a handle and guide-ring 24, through which the wire passes to a guide-ring 25, secured to the outside of the right shaft by an arm 26, projecting at right angles thereto. Said rings are beveled or rounded upon the inside in order that the barbs on the wire may pass freely through them.

27 is a sheave having an arbor and detachably mounted in a block 28 by a pin or shaft 29, which is removable.

30 is a yoke pivoted to the right runner and is provided with a spur 31. Said yoke is shown in Fig. 1 as swung out, bringing the spur in contact with the earth, forming an automatic anchoring device. When the yoke is swung back, it lifts the spur to the position shown in Fig. 2.

32 is a rod pivotally secured to the rear end of the brace-bar 4, its upper end being hook-shaped.

33 is a lever (shown in detail in Fig. 5) provided with a hook 34, having a divided shank which embraces said lever and is secured thereto by a pin or bolt 35, passed through perforations in said shank and lever, as shown. There are several perforations in said shank for adjusting the same. In Fig. 1 said lever is shown in position, the arms forming a loop and engaging with an end or corner of one of the arms or cross-pieces of the spool.

To operate the machine in laying the wire, the crank and ratchet-wheel being first removed and the reel-shaft dismounted, the reel is slipped on the shaft, which is then replaced in its bearings. The reel-holder is secured to the reel by placing its lugs 19 in the slots cut in the cross-piece and the proper tension is given by the screw 18 to cause the reel to revolve with the shaft. The wire is then passed down under the spool and around the sheave, as seen in Fig. 1.

In paying out wire the spool may be rigidly clamped to the reel-shaft by the holder 17, and the attendant may control the revolutions of the spool by the crank, or to dispense with this control the reel-shaft may be locked or rigidly clamped by the clamp 11 and screw 12. In the latter case the tension of the spool-holder is regulated by the screw 18 to allow the spool to revolve on the reel-shaft as the machine is moved forward, said spool being revolved by the pull upon the wire, and the rapidity of its revolution being governed by the tension-screw 18. To tighten the wire, the reel is revolved in the opposite direction by the crank, the tension upon the clamp 11 being first released. When it is desired to use additional power in stretching the wire, the lever 33 and hook 34 are brought to bear upon the reel. If the spool is full of wire and the ends or corners of the arms of said spool are not exposed, the hook 34 is embedded in the wire and the lever operated by pressing down the handle end. When the ends or corners are exposed, the shank of the hook is placed over the same, as shown in Fig. 1. The perforations in said shank allow for adjusting it to different lengths to meet the varying diameter of the body of wire on the spool as it is unwound. The pawl-and-ratchet wheel serve to lock the reel-shaft, and the hook on the end of the rod 32 also serves this purpose, the hook being fastened to one of the ends or corners of the spool-arms. Said hook also serves as a support for rod 32 when not in use, as shown in Fig. 1.

In tightening or stretching the wire the spur 31 is placed in contact with the earth, in which position it acts automatically. Supposing the machine to advance, its spur is disengaged from the earth by the forward movement of the machine and drags over the surface of the ground after it; but it is instantly forced into the earth as soon as there is a backward movement of the machine, and thereby anchors it against such movement. To take up the wire, the empty spool is secured to the reel-shaft by the spool-holder and the proper tension given to cause it to revolve with the shaft. The wire is then threaded through the guide-rings 24 25 and fastened to the spool, and the attendant, riding upon the platform, operates the crank which winds the wire upon the spool.

To distribute the wire evenly upon the spool, the attendant swings the pivoted arm 23 from side to side, as needed. The right shaft is elongated and the ring 25 is projected out to one side from the end of this shaft, as shown in Fig. 2. The purpose of this arrangement is to lead the wire ahead and to one side of the horse to prevent its being stepped upon or causing injury.

When it is desired to use the spool detached, as in places inaccessible to the machine, the spool and shaft are dismounted from the uprights and a frame 22 is mounted on the shaft, as shown in Fig. 3, excepting that the crank and ratchet wheel may be removed. The tension of the spool-holder is then relaxed to allow the spool to revolve on the shaft. This frame affords a convenient holder for the spool and protects the attendant from injury, and may be used either in taking up or laying out wire.

The frame of the machine is designed especially to protect the horse from injury in taking up wire, to present the mechanism as close as possible in the line of the wire or to the fence-posts, and at the same time to provide a stand for the attendant convenient to the mechanism, which stand is accessible and readily mounted.

Having shown and described my invention, what I claim, and desire to secure by Letters Patent, is—

1. In a wire-fence machine, a frame mounted upon runners having a reel-shaft mounted to one side thereof, and an operator's platform adjacent thereto on the opposite side, substantially as shown and described.

2. A frame for wire-fence machines, having attached thereto an elongated shaft provided with a wire-guide ring projected to one side and in front of the horse, substantially as shown and described.

3. In a wire-fence machine, the combination, with a spool and a reel-shaft, of a shaft-embracing clamp having horizontally-projecting lugs which engage with recesses in the spool and a screw for adjusting the tension of the clamp or securing the same rigidly to the reel-shaft, substantially as shown and described.

4. In a wire-stretching machine, the combination, with a spool of wire, of a hook for engaging with the spool of wire, said hook having a curved and divided shank pivotally mounted upon a lever, substantially as shown and described.

5. In a wire-fence machine, the combination, with a spool of wire, of a lever and a hook pivotally mounted thereon, having a curved and divided shank forming a loop for engaging with the ends or corners of the arms or cross-pieces of the spool of wire.

In testimony whereof I affix my signature in presence of two witnesses.

JOHN HARPER.

Witnesses:
 DAVID B. WILSON,
 SAMUEL H. WATKINS.